United States Patent Office 3,138,526
Patented June 23, 1964

3,138,526
COMPOSITIONS FOR TREATING BRONCHOSPAS-
TIC DISORDERS COMPRISING THEOPHYLLINE,
EPHEDRINE, AND 7-CHLORO - 2 - METHYLAMI-
NO - 5 - PHENYL - 3H - 1,4 - BENZODIAZEPINE-4-
OXIDE
Virginius Dante Mattia, Jr., Nutley, N.J., assignor to
Hoffmann-La Roche Inc., Nutley, N.J., a corporation
of New Jersey
No Drawing. Filed Nov. 6, 1962, Ser. No. 235,848
7 Claims. (Cl. 167—55)

This invention relates, in general, to novel pharmaceutical compositions. More particularly, the invention relates to therapeutically active compositions which are especially well suited for use in the treatment of bronchospastic disorders.

7-chloro-2-methylamino - 5 - phenyl-3H-1,4-benzodiazepine-4-oxide, and medicinally acceptable acid addition salts thereof, are known compounds which have pronounced sedative activity. Moreover, dimethylxanthine and the hydrochloride salt of α-(1-methylaminoethyl)-benzyl alcohol are known compounds. The use of dimethylxanthine, hereinafter referred to as theophylline, and the use of the hydrochloride salt of α-(1-methylaminoethyl)-benzyl alcohol, hereinafter referred to as ephedrine hydrochloride, in therapeutic compositions designed for use in the treatment of bronchospastic disorders is not, in and of itself, novel. However, it has been found that when theophylline and ephedrine hydrochloride are used in combination with 7-chloro-2-methylamino-5-phenyl-3H - 1,4 - benzodiazepine-4-oxide, or in combination with a medicinally acceptable acid addition salt of 7-chloro-2-methylamino-5-phenyl-3H-1,4-benzodiazepine-4-oxide, bronchial edema, bronchospasm, and anxiety of bronchospastic disorders, as well as other allergic conditions, are controlled more effectively.

Thus, in its most comprehensive embodiment, the present invention is concerned with pharmaceutical compositions containing 7-chloro-2-methylamino-5-phenyl-3H-1,4-benzodiazepine-4-oxide, or one of its medicinally acceptable acid addition salts, in a combination with theophylline and ephedrine hydrochloride.

In a more particular embodiment, the invention is concerned with pharmaceutical compositions, in suitable oral dosage forms, which compositions have 7-chloro-2-methylamino-5-phenyl-3H-1,4-benzodiazepine-4-oxide, or one of its medicinally acceptable acid addition salts, present in admixture with theophylline and ephedrine hydrochloride.

Still further embodiments of the invention reside in the formulation of such pharmaceutical compositions into suitable oral dosage forms and in the use of such compositions in the treatment and control of bronchospastic disorders.

As indicated heretofore, 7-chloro-2-methylamino-5-phenyl-3H-1,4-benzodiazepine-4-oxide, or a medicinally acceptable acid addition salt thereof, is used in the practice of this invention. For convenience, the expression "medicinally acceptable acid addition salt" will be used throughout the present specification to denote salts formed by reacting 7-chloro-2-methylamino-5-phenyl-3H-1,4-benzodiazepine-4-oxide with a medicinally acceptable acid. Suitable for use are salts of 7-chloro-2-methylamino-5-phenyl-3H-1,4-benzodiazepine-4-oxide with either convention mineral acid, such as hydrochloric acid, hydrobromic acid, nitric acid, phosphoric acid, etc., or with conventional organic acids, such as benzoic acid, toluene sulfonic acid, acetic acid, citric acid, maleic acid, tartaric acid, lactic acid, etc. In producing the preferred products of the invention, however, 7-chloro-2-methylamino-5-phenyl-3H-1,4-benzodiazepine-4-oxide, or the hydrochloride salt thereof, is used.

The compositions of this invention are prepared simply by admixing 7-chloro-2-methylamino-5-phenyl-3H-1,4-benzodiazepine-4-oxide, or a medicinally acceptable salt thereof, with theophylline and ephedrine hydrochloride. The mixture is ultimately embodied into a suitable oral dosage form. For example, the compositions of this invention can be compressed, by usual methods, into single or multi-layer tablets. Moreover, the preparations can be produced in the form of coated tablets. Additionally, the preparations of this invention can be provided in the form of hard-shell capsules. In general, the various oral dosage forms of the present compositions are prepared by the convention procedures and techniques of the art. The applicability of such methods and techniques to the formulation of the compositions of the present invention will be readily apparent to those skilled in the art.

In addition to the therapeutically active ingredients mentioned heretofore, the compositions of this invention can contain, as optional ingredients, any of the various adjuvants which are used ordinarily in the production of pharmaceutical preparations. Thus, for example, in formulating the present compositions into the desired oral dosage forms, one may use, as optional ingredients, fillers, such as coprecipitated aluminum hydroxide-calcium carbonate, dicalcium phosphate or lactose; disintegrating agents, such as maize starch; and lubricating agents, such as talc, calcium stearate, etc. It should be fully understood, however, that the optional ingredients herein named are given by way of example only and that the invention is not restricted to the use thereof. On the contrary, other such adjuvants, the identity and use of which are well known in the art, can be, and are, employed in carrying out this invention.

The ratios in which the therapeutically active components are embodied in the preparations of this invention may be varied within rather wide limits. For example, the compositions may contain from about 5 parts by weight to about 40 parts by weight of theophylline, and from about 1 part by weight to about 6 parts by weight of ephedrine hydrochloride for each part by weight of 7-chloro-2-methylamino-5-phenyl-3H - 1,4 - benzodiazepine-4-oxide, or for each part by weight of a salt thereof, present therein. The preferred preparations of the invention, however, contain from about 10 parts by weight to about 28 parts by weight of theophylline and from about 2 parts by weight to about 5 parts by weight of ephedrine hydrochloride for each part by weight of 7-chloro-2-methylamino-5-phenyl-3H-1,4 - benzodiazepine-4-oxide, or for each part by weight of a salt thereof, present therein.

The compositions of the present invention, in preferred unit dosage form, will contain from about 5 mg. to about 12 mg. of 7-chloro-2-methylamino-5-phenyl-3H-1,4-benzodiazepine-4-oxide or salt thereof. A preparation containing from about 5 mg. to about 12 mg. of 7-chloro-2 - methylamino-5-phenyl-3H-1,4-benzodiazepine-4-oxide, or from about 5 mg. to about 12 mg. of a medicinally acceptable salt of 7-chloro-2-methylamino-5-phenyl-3H-1,4-benzodiazepine-4-oxide, will, preferably, contain also about 130 mg. of theophylline and about 24 mg. of ephedrine hydrochloride.

Typical oral dosages of the compositions of the present invention will vary. For example, in the case of a preparation containing 12 mg. of 7-chloro-2-methylamino-5-phenyl-3H-1,4-benzodiazepine-4-oxide, or 12 mg. of a medicinally acceptable salt thereof, a typical oral dosage for an adult will be up to one dose every six hours, as required. On the other hand, in the case of a preparation containing 5 mg. of 7-chloro-2-methylamino-5-3H-1,4-benzodiazepine-4-oxide, a typical oral dosage for an adult will be up to one dose every three hours, as required. In the case of children, age 6 to 12 years, or in the case of debilitated patients, smaller dosages may, of course, be more appropriate. However, in the case of patients who are experiencing more severe discomfort due to a bronchospastic disorder, more frequent administration of the preparations of this invention may be prescribed. The foregoing notwithstanding, it should be fully understood that the dosages set forth herein are exemplary only and that they do not, to any extent, limit the scope or the practice of the present invention.

As indicated heretofore, the combination products of this invention have been found to be well suited for use in the control of bronchial edema, broncho spasm and anxiety of bronchospastic disorders, such as bronchial asthma, asthmatic bronchitis and other allergic conditions. When the present compositions are utilized in the treatment of such indications, prompt and effective relief is provided. A most important feature of the present invention resides in the fact that the desired relief is obtained with a minimum of undesirable side effects. In fact, it has been found that a pronounced decrease in the side effects which often accompany the use of ephedrine hydrochloride occurs, when ephedrine hydrochloride is administered in the combination described herein. Moreover, the incidence of drowsiness, which often results when a bronchospastic disorder is treated with certain of the phenobarbital-containing products of the prior art, is dramatically reduced when 7-chloro-2-methylamino-5-phenyl-3H-1,4-benzodiazepine-4-oxide, or a medicinally acceptable acid addition salt thereof, is used in admixture with theophylline and ephedrine hydrochloride in lieu of phenobarbital or in lieu of a phenobarbital derivative.

For a fuller understanding of the nature and objects of this invention, reference may be had to the following examples which are given merely as further illustrations of the invention and are not to be construed in a limiting sense.

*Example 1*

The following ingredients, in the ratios indicated, were intimately mixed in a suitable container:

| | Mg./tablet |
|---|---|
| 7-chloro-2-methylamino - 5 - phenyl-3H-1,4-benzodiazepine-4-oxide | 10.5 |
| Theophylline | 132.6 |
| Ephedrine hydrochloride | 24.5 |
| Cornstarch | 37.0 |
| Lactose | 86.4 |
| Gelatinized cornstarch | 6.0 |

This mixture was passed through a Fitzpatrick comminuting machine using a No. 1A screen, knives forward, operating at high speed. The mixture was thereafter granulated using distilled water, following which it was passed through a Fitzpatrick comminuting machine, without a screen, knives forward, operating at medium speed. The powder was then dried at 110° F. and ground through a 16 mesh screen. Thereafter, 6.0 mg./tablet of Amberlite XE-88 (a synthetic exchange resin of the carboxylic acid type, marketed by Rohm & Haas Company, Philadelphia, Pennsylvania), and 3.0 mg./tablet of calcium stearate was added to, and intimately mixed with, the mixture.

The mixture was thereafter compressed into tablets and the tablets were coated by conventional procedures.

*Example 2*

In this example, the following-named ingredients were intimately admixed in the ratios hereinafter indicated:

| | Mg./tablet |
|---|---|
| 7-chloro - 2 - methylamino-5-phenyl-3H-1,4-benzodiazepine-4-oxide | 5.25 |
| Theophylline | 132.6 |
| Ephedrine hydrochloride | 24.5 |
| Cornstarch | 36.65 |
| Lactose | 86.0 |
| Gelatinized cornstarch | 6.0 |

This mixture was compounded by the method described in Example 1 following which 6.0 mg./tablet of Amberlite XE-88 and 3.0 mg./tablet of calcium stearate were added thereto.

The mixture, thus obtained, was compressed into tablets and the tablets were coated by conventional methods.

I claim:

1. A therapeutic composition comprising theophylline, ephedrine hydrochloride and a compound selected from the group consisting of 7-chloro-2-methylamino-5-phenyl-3H-1,4-benzodiazepine-4-oxide and a salt thereof with a medicinally acceptable acid in a pharmaceutically acceptable carrier.

2. A therapeutic composition for internal administration in unit dosage form comprising (1) a mixture of theophylline, ephedrine hydrochloride and 7-chloro-2-methylamino - 5 - phenyl-3H-1,4-benzodiazepine-4-oxide with (2) pharmaceutical adjuvant materials.

3. A therapeutic composition for internal administration in shaped unit dosage form comprising (1) a mixture of theophylline, ephedrine hydrochloride and 7-chloro-2-methylamino - 5 - phenyl-3H-1,4-benzodiazepine-4-oxide with (2) solid pharmaceutical adjuvant materials, there being present in said composition, for each part by weight of said 1,4-benzodiazepine-4-oxide compound, from about 5 parts to about 40 parts by weight of theophylline and from about 1 part to about 6 parts of ephedrine hydrochloride.

4. A therapeutic composition for internal administration in unit dosage form comprising (1) a mixture of theophylline, ephedrine hydrochloride and a medicinally acceptable acid addition salt of 7-chloro-2-methylamino-5-phenyl-3H-1,4-benzodiazepine-4-oxide with (2) pharmaceutical adjuvant materials.

5. A therapeutic composition for internal administration in shaped unit dosage form comprising (1) a mixture of theophylline, ephedrine hydrochloride and a medicinally acceptable salt of 7-chloro-2-methylamino-5-phenyl-3H-1,4-benzodiazepine - 4 - oxide with (2) solid pharmaceutical adjuvant materials, there being present in said composition, for each part by weight of said 1,4-benzodiazepine-4-oxide compound, from about 5 parts to about 40 parts by weight of theophylline and from about 1 part to about 6 parts of ephedrine hydrochloride.

6. The composition of claim 5 wherein the hydrochloric acid salt of 7-chloro-2-methylamino-5-phenyl-3H-1,4-benzodiazepine-4-oxide is present.

7. A process for treating bronchospastic disorders which comprises internally administering a therapeutic composition comprising theophylline, ephedrine hydrochloride, and a compound selected from the group consisting of 7 - chloro-2-methylamino-5-phenyl-3H-1,4-benzodiazepine-4-oxide and a salt thereof with a medicinally acceptable acid in a pharmaceutically acceptable carrier.

References Cited in the file of this patent

Wilson: American Drug Index, 1961, pp. 284–286.
New England Journal of Medicine, vol. 264, No. 17, August 1961, pp. 870–873.
Physician Desk Reference, P.D.R., 1962, pp. 784, 792 and 794.

UNITED STATES PATENT OFFICE
CERTIFICATE OF CORRECTION

Patent No. 3,138,526                        June 23, 1964

Virginius Dante Mattia, Jr.

It is hereby certified that error appears in the above numbered patent requiring correction and that the said Letters Patent should read as corrected below.

Column 1, line 66, for "acid", first occurrence, read -- acids --; column 3, line 7, for "-5-3H-" read -- -5-phenyl-3H- --.

Signed and sealed this 17th day of November 1964.

(SEAL)
Attest:

ERNEST W. SWIDER
Attesting Officer

EDWARD J. BRENNER
Commissioner of Patents